United States Patent
Cherubini et al.

(10) Patent No.: US 11,188,236 B2
(45) Date of Patent: Nov. 30, 2021

(54) AUTOMATICALLY ORGANIZING STORAGE SYSTEM

(71) Applicant: International Business Machines Corporation, Armonk, NY (US)

(72) Inventors: Giovanni Cherubini, Rueschlikon (CH); Ilias Iliadis, Rueschlikon (CH); Jens Jelitto, Rueschlikon (CH); Vinodh Venkatesan, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/012,863

(22) Filed: Jun. 20, 2018

(65) Prior Publication Data

US 2018/0314443 A1 Nov. 1, 2018

Related U.S. Application Data

(62) Division of application No. 14/837,297, filed on Aug. 27, 2015, now abandoned.

(30) Foreign Application Priority Data

Aug. 28, 2014 (GB) ...................... 1415248

(51) Int. Cl.
  *G06F 3/06* (2006.01)
  *G06F 12/123* (2016.01)
  *G06F 12/02* (2006.01)

(52) U.S. Cl.
  CPC .......... *G06F 3/0619* (2013.01); *G06F 3/0608* (2013.01); *G06F 3/0623* (2013.01);
  (Continued)

(58) Field of Classification Search
  CPC .... G06F 3/0619; G06F 3/0665; G06F 3/0685; G06F 3/0647; G06F 3/0683;
  (Continued)

(56) References Cited

U.S. PATENT DOCUMENTS 7,725,475 B1   5/2010  Alspector et al.
8,019,706 B2   9/2011  Madison, Jr. et al.
(Continued)

FOREIGN PATENT DOCUMENTS

| GB | 2483297 A | 7/2012 |
| GB | 2529669 B | 10/2016 |
| WO | 2014189403 A1 | 11/2014 |

OTHER PUBLICATIONS

Belikov et al., Target for LOFAR Long Term Archive: Architecture and Implementation, Nov. 28, 2011, Astronomical Society of the Pacific, ASP Conference Series, pp. 1-4 (Year: 2011).*

(Continued)

*Primary Examiner* — Andrew J Cheong
(74) *Attorney, Agent, or Firm* — Peter J. Edwards

(57) ABSTRACT

A storage system and a method for storing a data segment, a storage capacity manager and a method for managing a capacity of a storage unit, and a storage tier relocation manager and a method for relocating a data segment. The storage system includes at least two storage tiers, an access pattern evaluator, a classification unit, a selector, and logic. The storage capacitor manager includes a monitoring unit and capacity managing unit. The storage tier relocation manager includes a target storage tier, the data segment relocated to the target storage tier, and a protection measure.

4 Claims, 2 Drawing Sheets

(52) U.S. Cl.
CPC .......... *G06F 3/0643* (2013.01); *G06F 3/0647* (2013.01); *G06F 3/0653* (2013.01); *G06F 3/0685* (2013.01); *G06F 12/023* (2013.01); *G06F 12/123* (2013.01); *G06F 2212/1032* (2013.01)

(58) Field of Classification Search
CPC .................. G06F 12/023; G06F 12/123; G06F 2212/1032; G06F 2212/69
See application file for complete search history.

(56) References Cited

U.S. PATENT DOCUMENTS

| | | | |
|---|---|---|---|
| 8,239,584 B1 | 8/2012 | Rabe et al. | |
| 8,315,995 B1 | 11/2012 | Levy | |
| 8,370,312 B1* | 2/2013 | Sawhney | H04L 67/1097 707/694 |
| 8,370,597 B1 | 2/2013 | Chatterjee et al. | |
| 8,433,848 B1 | 4/2013 | Naamad et al. | |
| 8,578,096 B2 | 11/2013 | Malige et al. | |
| 8,880,801 B1 | 11/2014 | Robins et al. | |
| 2001/0020977 A1 | 9/2001 | Watanabe | |
| 2003/0046270 A1 | 3/2003 | Leung et al. | |
| 2003/0088813 A1 | 5/2003 | McClellan et al. | |
| 2004/0044659 A1 | 3/2004 | Judd et al. | |
| 2004/0205390 A1 | 10/2004 | Kanevsky et al. | |
| 2005/0283567 A1 | 12/2005 | Popescu-Stanesti et al. | |
| 2005/0289597 A1 | 12/2005 | Kawahara et al. | |
| 2006/0004820 A1 | 1/2006 | Claudatos et al. | |
| 2006/0059409 A1* | 3/2006 | Lee | H03M 13/1515 714/784 |
| 2006/0264748 A1* | 11/2006 | Vaezy | A61B 8/12 600/437 |
| 2007/0081825 A1* | 4/2007 | Rossetti | H04B 10/2581 398/141 |
| 2007/0098386 A1* | 5/2007 | Yoneda | H04N 5/232 396/60 |
| 2008/0114750 A1 | 5/2008 | Saxena et al. | |
| 2009/0070651 A1 | 3/2009 | Diggs et al. | |
| 2009/0112789 A1 | 4/2009 | Oliveira et al. | |
| 2009/0112880 A1 | 4/2009 | Oliveira et al. | |
| 2009/0182957 A1 | 7/2009 | Yashiro | |
| 2009/0222329 A1 | 9/2009 | Ramer et al. | |
| 2011/0004626 A1 | 1/2011 | Naeymi-Rad et al. | |
| 2011/0004809 A1* | 1/2011 | Hirth | H03M 13/333 714/777 |
| 2011/0082991 A1* | 4/2011 | Leman | G06F 11/1456 711/162 |
| 2011/0282830 A1 | 11/2011 | Malige et al. | |
| 2012/0110259 A1 | 5/2012 | Mills et al. | |
| 2012/0144272 A1 | 6/2012 | Franceschini et al. | |
| 2012/0177328 A1 | 7/2012 | Marcouiller et al. | |
| 2013/0185256 A1 | 7/2013 | Alatorre et al. | |
| 2013/0227016 A1 | 8/2013 | Risher et al. | |
| 2013/0238563 A1 | 9/2013 | Amarendran et al. | |
| 2013/0282982 A1 | 10/2013 | Hayashi | |
| 2014/0032861 A1 | 1/2014 | Islam et al. | |
| 2014/0036383 A1 | 2/2014 | Cideciyan et al. | |
| 2014/0087355 A1 | 3/2014 | Henry et al. | |
| 2014/0115579 A1 | 4/2014 | Kong | |
| 2014/0136927 A1 | 5/2014 | Li et al. | |
| 2014/0229655 A1 | 8/2014 | Goss et al. | |
| 2014/0229790 A1 | 8/2014 | Goss et al. | |
| 2014/0281322 A1 | 9/2014 | Martin | |
| 2014/0363088 A1* | 12/2014 | Cha | G06K 9/00382 382/195 |
| 2015/0269000 A1 | 9/2015 | Alexeev et al. | |
| 2015/0293984 A1 | 10/2015 | Zolotuslcy, Jr. et al. | |
| 2015/0381725 A1 | 12/2015 | Haapaoja et al. | |
| 2016/0062689 A1 | 3/2016 | Cherubini et al. | |
| 2016/0070492 A1 | 3/2016 | Cherubini et al. | |
| 2016/0085469 A1 | 3/2016 | Cherubini et al. | |

OTHER PUBLICATIONS

Garcia et al., Two-dimensional spectral analysis of mesospheric airglow image data, Oct. 10, 1997, Applied Optics, vol. 36, No. 29, pp. 1-5 (Year: 1997).*
Bishop, 5.3.1-Curve Fitting: Least Squares Regression with Sinusoids, publicly available 20 Sep. 20, 2013, retrieved from YouTube on Aug. 27, 2018 (https://www.youtube.com/watch?v=afQszl_OwKo&list=PLYdroRCLMg5NTT00m-7ituVGdtY1X680M&index=13) (Year: 2013).*
Unknown, Maximize Operational Efficiency for Oracle RAC Environments With EMC Symmetrix Fast VP (Automated Tiering), An Architectural Overview, White Paper, EMC Global Solutions, Feb. 2011, pp. 1-37.
Moore, F., "Tiered Storage Takes Center Stage," Hodson Inc., Dec. 21, 2010, pp. 1-11.
Cudre-Mauroux et al., "Trajstore: An Adaptive Storage System for Very Large Trajectory Data Sets," MIT CSAIL, Mar. 1-6, 2010, pp. 1-12.
UKSearch Report; Application No. GB1415249.0; Patent Act 1977: Search Report under Section 17(5); dated Mar. 17, 2015, pp. 1-4.
Chen et al.,"Optimizing an Oracle Database With Dell Compellent Automated Tiered Storage," Database Solutions Engineering, Dell Product Group, Oct. 2012, pp. 1-22.
UK Search Report, Application No. GB1415248.2, Patents Act 1977: Search Report under Section 17(5), dated Feb. 27, 2015, 3 pages.
IBM, List of IBM Patents or Patent Applications Treated as Related, Dated Jun. 18, 2018, 2 pages.
Slonim et al., "Agglomerative Informative Bottleneck," NIPS, Hebrew University, Israel, 1999, 7 pages.

* cited by examiner

AUTOMATICALLY ORGANIZING STORAGE SYSTEM

CROSS-REFERENCE TO RELATED APPLICATION

This application claims the benefit of priority from United Kingdom Patent Application No. 1415248.2, filed Aug. 28, 2014, the contents of which are incorporated herein by reference.

FIELD OF THE INVENTION

The present invention relates to a storage system. More particularly, the present invention relates to a method for storing a data segment in a storage tier of a storage unit including at least two storage tiers.

BACKGROUND

Today's multi-tiered storage systems are suited for offering a trade-off between high performance and efficient low-cost long-term storage of data. However, very limited intelligence is usually available to determine without human intervention within which tier a certain data file should be stored. While today's approach can be adequate for most applications given the number and size of data files that need to be stored and retrieved, it appears that a new paradigm is needed to address the challenges posed by applications where a very large amount of data is to be stored and valuable information reliably is to be identified and accessed. Examples of so-called big data applications are emerging in various fields, including social networks, sensor networks, and huge archives of business, scientific and government records. One of the critical big data challenges, however, is represented by a Square Kilometer Array ("SKA") telescope, expected to be completed in 2024, whose antennas will gather tens of exabytes of data and store petabytes of data every day. Another significant big data challenge lies in the healthcare industry, where personalized medicine and large-scale cohort studies can require storage of medical data for extended periods of time.

SUMMARY OF THE INVENTION

The present invention provides a storage system including a storage unit including at least two storage tiers, and an access pattern evaluator configured to provide information about a frequency at which data segments stored in at least one of the at least two storage tiers are accessed; in a classification unit, at least one out of a set of at least two relevance classes is assigned to a data segment received for storing in the storage unit dependent on information included in the data segment; in a selector a storage tier out of the at least two storage tiers is determined for storing the classified data segment dependent on at least access frequency information provided by the access pattern evaluator for data segments in the same relevance class. In addition, a level of protection is determined in the selector for the classified data segment dependent on at least the relevance class assigned. Logic is provided for storing the classified data segment including the assigned relevance class to the determined storage tier and according to the determined level of protection.

The present invention also provides a method for storing a data segment in a storage tier of a storage unit including at least two storage tiers. At least one out of a set of at least two relevance classes is assigned to the data segment dependent on information included in the data segment. Information is received about a frequency at which data segments stored in at least one of the at least two storage tiers are accessed. A storage tier out of the at least two storage tiers is determined for storing the classified data segment dependent on at least the access frequency information received for data segments in the same relevance class. A level of protection is determined for the classified data segment dependent on at least the relevance class assigned. The classified data segment including the assigned relevance class is stored to the determined storage tier and according to the determined level of protection.

The present invention also provides a storage tier relocation manager for relocating a data segment presently stored in a storage tier of a storage unit with at least two storage tiers, the data segment having assigned a protection level out of a set of protection levels. The storage tier relocation manager is configured to determine a target storage tier for the data segment dependent on access frequency information received for the data segment or for a relevance class to which the data segment is assigned. The storage tier relocation manager is further configured to relocate the data segment to the target storage tier if the target storage tier is different from the present storage tier, and in this case to apply a protection measure suitable for achieving the assigned protection level.

The present invention also provides a method for relocating a data segment presently stored in a storage tier of a storage unit with at least two storage tiers, the data segment having assigned a protection level out of a set of protection levels. A target storage tier is determined for the data segment dependent on access frequency information received for the data segment or for a relevance class to which the data segment is assigned. The data segment is relocated to the target storage tier if the target storage tier is different from the present storage tier. In this case a protection measure is applied suitable for at least achieving the assigned protection level.

The present invention also provides a storage capacity manager for a storage system including a storage unit for storing data segments having at least one relevance class assigned per data segment. The storage capacity manager includes a monitoring unit for determining if a utilization of the storage unit fulfils a criterion, and a capacity managing unit for, in response to the utilization of the storage unit fulfilling the criterion, selecting at least one data segment stored in the storage unit for one of a deletion thereof or a deletion of a copy thereof at least dependent on the relevance class assigned.

The present invention also provides a method for managing a capacity of a storage unit for storing data segments having at least one relevance class out of a set of at least two relevance classes assigned per data segment. It is determined if a utilization of the storage unit fulfils a criterion. In response to the utilization of the storage unit fulfilling the criterion, at least one data segment stored in the storage unit is selected for one of a deletion thereof or a deletion of a copy thereof at least dependent on the relevance class assigned.

It is understood that method steps can be executed in a different order than listed in a method claim. Such different order shall also be included in the scope of such claim as is the order of steps as presently listed.

BRIEF DESCRIPTION OF THE DRAWINGS

The invention and its embodiments will be more fully appreciated by reference to the following detailed descrip- FIG. 1, a block diagram of a storage system according to an embodiment of the present invention.

Figure 1:
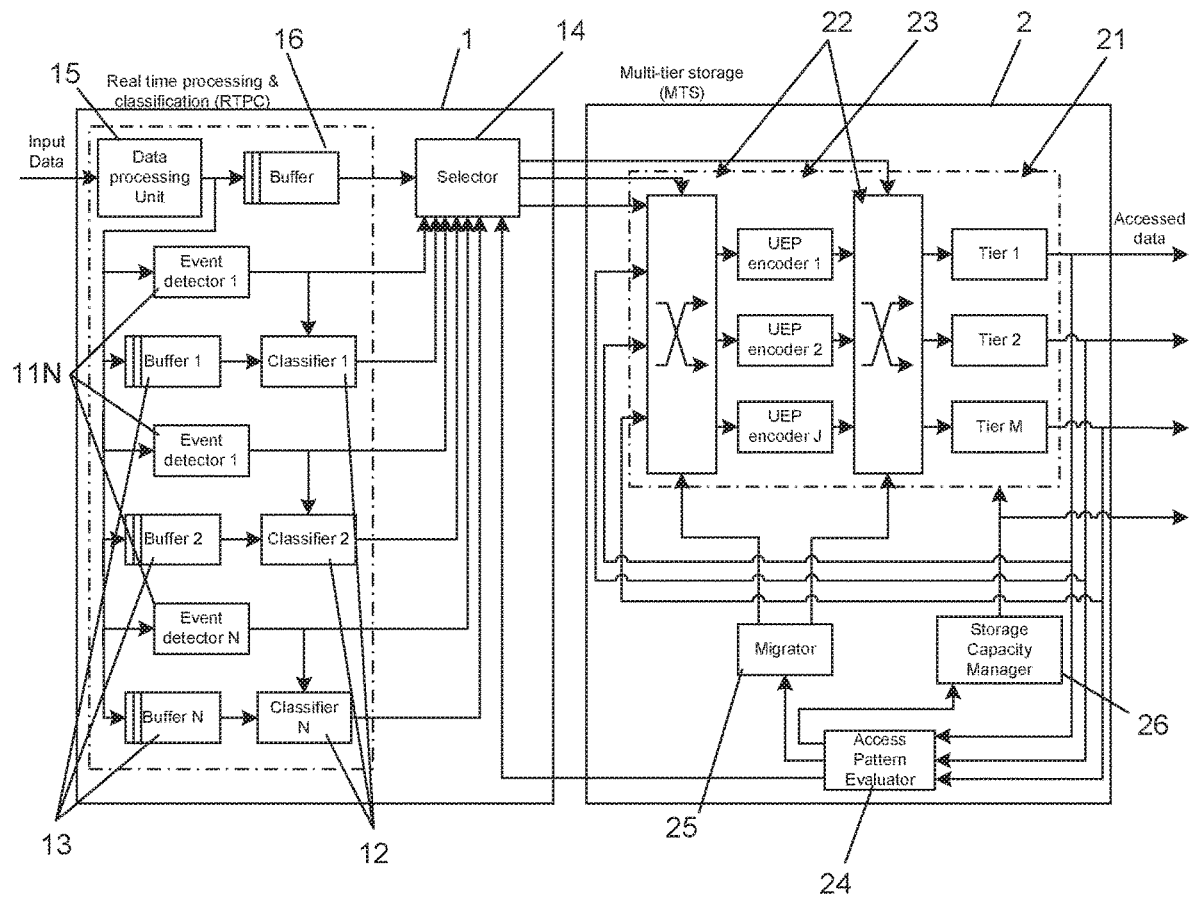

DETAILED DESCRIPTION OF THE
PREFERRED EMBODIMENTS

As an introduction to the following description, it is first pointed at general aspects of the invention.

A storage system is understood as a tiered storage system once it includes multiple tiers of storage. Different storage tiers preferably are embodied as storage devices of different technology, including but not limited to tape storage technology, hard disk drive (HDD) storage technology, solid state drive (SDD) storage technology such as flash storage, etc. The storage devices can offer different characteristics per storage tier, that can e.g. include storage volume, reliability e.g. measured in form of bit error rates, performance including access time, cost, term of storage, etc., such that when combining different storage technologies into a tiered storage system, considerable advantages can be achieved given that storage devices with different characteristics can be selected for storing data segments subject to the needs of the different data segments to be stored. It is preferred that in a multi-tiered storage system each storage tier includes only one type of storage device. In a different embodiment, different tiers of a tiered storage can be based on the same storage technology. However, they can still show different characteristics owed to the usage of storage devices of different generations or of electrical connections of different quality, such that these storage devices differ in at least one characteristic that can be relevant for storing data segments. Such can impact the decision on which kind of storage device to place a data segment.

Generally, the different storage tiers can not necessarily reside at a common location or in a common housing but can be distributed as long as the classification unit to be introduced later on has access to the storage tiers and can store data segments to and retrieve data segments from the various storage tiers. Each storage tier as such can contain at least one physical device. For example, an HDD storage tier can contain up to hundreds of HDDs, or in a different embodiment, only a single HDD.

Data segments shall include any unit of data to be stored and in case of a tiered storage system, any unit of data that can be a subject of an individual decision as to where in the tiered storage it is desired to be stored. Data segments can include at least one block, page, segment, file, objects file, portions of a data stream, etc.

An access pattern evaluator is configured to monitor accesses to the data segments stored in the storage unit, i.e. in at least one and preferably all of the various storage tiers. Accesses can in particular encompass read and/or write operations on a data segment, e.g. when a user of the storage system reads data segments from the tiered storage. The access pattern evaluator is configured to output such access patterns in form of access frequencies for the data segments. In a preferred embodiment, the access frequencies are not individually monitored and supplied, but access frequencies are provided with respect to relevance classes into which the stored data segments are classified as will be explained later on. The access pattern evaluator can be embodied in one of hardware, software or a combination thereof.

It is noted that the access pattern evaluator provides statistical data in form of an access frequency. However, any other statistical data referring to accesses of stored data segments is meant to be subsumed under the term access frequency. The access pattern evaluator provides access frequencies for stored data segments, and as such evaluates a popularity of the data segments since the access frequency can be regarded as a measure of the popularity of a data segment or a relevance class into which the data segment is classified. The higher the access frequency the more popular the data segment or the corresponding relevance class is.

The storage system further includes a selector. The selector can be implemented in hardware, software or a combination of both. For every data segment to decide on, the selector receives, possibly amongst others, the relevance class assigned to the data segment by the classification unit and the access frequency information provided by the access pattern evaluator for data segments, and preferably for the particular relevance class to which the present data segment is assigned. Based on this information, i.e. the relevance class and the access frequency information for this relevance class, the selector determines a level of protection the data segment is to be stored with, and a storage tier in which the data segment is to be stored.

Hence, the selector takes its decision at least based on the content of the data segment, whose content is mapped into a relevance class as explained above. In one embodiment, a data segment with a high-rank relevance class is associated with a high value. Accordingly, its content is such that a loss would be associated with a high cost. Therefore, this data segment deserves a higher level of protection compared to data segments with lower value.

A classification unit as used in the context of the present invention is configured to classify a data segment that is requested to be stored in the storage unit into a relevance class. In one embodiment, two or more relevance classes can be assigned to a data segment, although the description mostly refers to one relevance class being assigned. A set of relevance classes from which a relevance class is selected for assignment preferably includes at least two relevance classes. The classification of a data segment into a relevance class preferably is based on information included in the data segment to be classified; this information is also referred to as the content of the data segment. Hence, it is the content of the data segment that is evaluated for performing the classification. However, in another embodiment, information included in other data segments, e.g. data segments that are linked in time or space to the data segment to be classified, can also be evaluated for assigning a relevance class to the data segment.

The classification unit can take different embodiments. Subject to the complexity of information in the data segments and the number of data segments arriving for storage, it can be preferred, that an event detector is provided. Such an event detector can evaluate the data segments to be classified for an occurrence of at least one pre-defined event. An event detector can evaluate a data segment on its own, or multiple data segments in combination. In an example of data segments representing images supplied by a telescope, an event can be considered as the occurrence of an astronomical event such as the occurrence of a planet in the image. A classifier can then classify the event in more detail, such as in at least one size, shape, color, etc. In this respect, the event detector can also be understood as a pre-classifier which limits the number of relevance classes available for this particular event down to a subset. The subsequent classifier then can only assign at least one relevance class of this subset.

In embodiments, the storage system can include at least one of the following features: the classification unit includes a set of event detectors with each event detector of the set being configured to detect a different event in the data segment received for storing; the classification unit includes a set of classifiers, each classifier being assigned to a different one of the event detectors, and each classifier of the set being configured to assign at least one relevance class pre-selected from the set of relevance classes for the event to be detected by the assigned event detector; a real-time data processing unit for real-time processing of input data segments and providing a sequence of data segments for storing; the selector is configured to determine the storage tier for the classified data segment dependent on the access frequency information provided by the access pattern evaluator for data segments in the same relevance class, and dependent on the relevance class assigned; wherein the selector is configured to determine the level of protection for the classified data segment dependent on the relevance class assigned and dependent on the access frequency information provided by the access pattern evaluator for data segments in the same relevance class; the selector is configured to determine a redundancy level for the classified data segment dependent on the determined protection level and the determined storage tier, the redundancy level specifying a number of copies of the classified data segment to be stored in the storage unit, and in particular specifying a number of copies of the classified data segment to be stored in which storage tier of the storage unit; the logic is configured to store copies of the classified data segment in at least one storage tier according to the determined level of redundancy; the selector is configured to determine at least one error correction code and an erasure code to be applied to the classified data segment dependent on the determined protection level and the determined storage tier; and the logic is configured to store the classified data segment with the at least one of the determined error correction codes and erasure code in the storage unit.

In another embodiment, multiple event detectors are provided and specifically each event detector is configured to detect a specific event that is different from the events the other event detectors are configured to detect. This arrangement is preferred in case parallel processing is required for big data applications. In such an embodiment, the classifier can be responsible for further classifying the detected events. However, it is preferred that one classifier is assigned to each event detector such that the number of classifiers corresponds to the number of event detectors. The classification can also be also parallelized. In another embodiment, multiple classifiers can be provided in combination with only a single event detector configured to detect different multiple events. In this case, the number of classifiers can correspond to the number of events that can be detected by the single event detector.

In another embodiment, the two step event detection and classification process can be replaced by a single classification step in which the data segments, which are input to the storage system, are evaluated versus the complete set of relevance classes. In the exemplary astronomical application, rather than looking for an astronomical event first and then classifying this event in more detail, the classification can be applied without prior event detection. Either way can result in the very same assignment of relevance class/es, e.g. "planet of size x and color y". In a different embodiment, the classification unit can solely include an event detector which at the same time acts as a classifier specifically when at least one dedicated class is assigned to event a priori. In a different view, the event can be known a priori, and only event features are to be identified, in which case an event detector is not needed.

The set of relevance classes available for tagging a data segment can be defined up-front and can be fixed and limited in size, or can change dynamically during operation of the storage system and/or during operation of a user application making use of the storage system. In one embodiment, self-learning algorithms are applied for changing and/or refining the set of relevance classes. For the overall storage system, it is envisaged that at least two relevance classes are provided and available for tagging the data segments. Subject to the complexity of the user application, hundreds of relevance classes can be available. In the case of a use of at least one event detector, the corresponding subsets of relevance classes that are assignable for a particular event are defined up-front. A subset can at minimum contain one relevance class in case the event is sufficiently defined by such relevance class.

Each relevance class can imply a certain relevance of the data segments being classified thereto, wherein some relevance classes can refer to data segments with a content considered more important than the content of data segments assigned to other relevance classes. However, in a preferred embodiment, a relevance class can in the first instance solely represent a description of the content of the subject data segment, such as in the above example "planet of size x and color y". Here, the relevance class assigned can rather be regarded as a descriptor for the content of the subject data segment. A relevance for the content described by the descriptor can at least later be added, e.g. by ranking the descriptors in order of relevance for storage purposes. Hence, the assignment of a relevance class to a data segment can in one embodiment include a mapping of descriptors to relevance classes, and e.g. also include a mapping of multiple different descriptors to a common relevance class. Finally, it is desired that a classification is applied that at least to some extent assigns a metric to a data segment reflecting an importance of the content of the data segment for storage purposes.

The classification unit assigns at least one relevance class to a data segment to be stored, which is considered to be equivalent to assigning the data segment to at least one relevance class. Preferably, only one relevance class is assigned per data segment. It is preferred that all data segments requested to be stored are classified and labelled by at least one relevance class. However, there can be envisaged a processing unit that preprocesses data segments arriving at the storage system. Such preprocessing can in one embodiment already lead to a selection of data segments to be stored out of all arriving data segments. In one embodiment, the processing unit is a real-time data processing unit for real-time processing of arriving data segments, also referred to as input data segments, e.g. in form of an input data stream, where the real-time data processing unit supplies a sequence of data segments to be stored, which are subsequently classified. Specifically, such a processing unit can apply at least one filtering operation, suppression of spurious data segments, removing interference data segments, etc.

Under the assumption that the data segments are provided to the storage system as an input data stream, it is preferred that at least one buffer be provided in the classification unit in order to temporarily buffer the incoming and/or pre-processed data segments for providing sufficient time for conducting the classification and the determination of protection level and storage tier as will be explained later on. Hence, in one embodiment, a buffer is provided for buffering a data segment received for storage for at least a period of time required by the classification unit for assigning a relevance class to this data segment. In case the classification is implemented by multiple classifiers, one buffer can be provided per classifier, or a common buffer can be provided for more or all classifiers. In addition, or independent from the above buffer/s, another buffer preferably is provided for buffering a data segment received for storage for at least a period of time required by the selector for determining the storage tier and the protection level. After the determination, the selector can forward the data segment to be stored together with the class information and information as to the determined protection level and information as to the suggested storage tier to the storage unit, and in particular its logic.

In a preferred embodiment, protection of a data segment in the present context can be oriented along the following types of impairment categories that a data segment can incur:

(a) data corruption where bits are altered,
(b) data erasure where bits are lost, and
(c) temporary data unavailability.

The corresponding metrics for these types of impairments can include: for type (a) impairments, a bit error rate metric; for type (b) impairments, a mean time to data loss ("MTTDL") metric or a mean annual amount of data lost ("MAADL") metric; for type (c) impairments, a percentage of time a data segment being unavailable;

These metrics again can be implemented by protection measures including at least one of the following: for type (a) impairments, a required bit error rate metric can be achieved by applying an error correction code of a given correction power to the data segment; for type (b) impairments, a MTTDL metric or MAADL metric can be achieved by applying an erasure code of a given correction power to the data segment; and for type (c) impairments, a percentage of time a data segment being unavailable can be limited by providing copies of the data segment in the storage unit, also referred to as applying a redundancy level.

The protection level to be assigned can be selected from a set of protection levels available. In a preferred embodiment, each protection level is defined by a combination of individual impairment levels not to be underrun in the various impairment categories. The protection level then is achieved by a protection measure that addresses at least one individually allowed impairment level by corresponding at least one measure or a combination thereof, or by selecting a suitable redundancy level for the data segment; selecting a suitable error correction code for the data segment; selecting a suitable erasure code for the data segment. The determination of the redundancy level can in one embodiment specify the number of copies of the data segment is to be stored in at least one of the storage tiers.

Through the monitoring of data segment accesses by the access pattern evaluator it can be determined which relevance classes or which corresponding data segments are more popular than others. Every time a data segment is accessed, the associated metadata information preferably including the relevance class is provided to the access pattern evaluator, which learns about a popularity of the information content in the data segments from the way they are being accessed. Access patterns can be found at various levels including at least one activity during various times of a day, sequence of reads and writes, access sequentiallity, or number of users retrieving the data. This information is used to preferably further classify data segments into one of several popularity classes and shall also be subsumed under the access frequency information.

Any time the access frequency information changes, e.g. the popularity class changes, such a change can be sent by the access pattern evaluator to the selector, which accordingly can update a metric for an initial decision on a level of protection and a storage tier of individual input data segments. Therefore, the selector determines the data segment placement in the tiered storage and the level of protection based on both a data relevance classification and data access statistics. In this manner, a data segment that belongs to a certain relevance class is passed out to a suitable storage tier and is protected by means at least achieving the required protection level, e.g. by at least one applying an error correction code, applying an erasure code, and a redundancy level that are most appropriate at a particular point in time.

In an embodiment, the selector assigns a protection level and a storage tier placement to an incoming data segment $d_n$ at time $nT$, where $1/T$ is the rate at which data segments are received, based on metrics that depend on two variables, named "relevance index" $ir(c_k)$, and "popularity index" $ip,n(c_k)$, where $c_k$ indicates the relevance class such that $d_n \in c_k$. Both $ir(c_k)$ and $ip,n(c_k)$ are real valued in the interval $[0, 1]$. Hence, it is apparent that classes are not necessarily restricted to discrete levels but also can be represented by real values as allowed. Note that the cardinality of the set of relevance classes is equal to $\square$, given by $\square=(K1+1)\times(K2+1)\times \ldots \times(KN+1)$, where $Kl$ denotes the number of classes of the l-th classifier, $l=1, 2, \ldots, N$. The relevance index corresponds to the importance of the relevance class as identified by the N classifiers, whereas the popularity index corresponds to the popularity of the relevance class as determined by the access pattern evaluator. The popularity index of each class varies over time depending on the access pattern, whereas the relevance index varies slowly compared to the popularity index, as a result of a varying assessment of the relevance of a class. It is assumed that at each time interval a new data segment is received, sufficient capacity is available at each storage tier for a new data segment allocation. The relevance class of a new data segment at the n-th time interval, denoted by $d_n$, is assigned by a classifier, or by the classification unit as such, and the relevance index is given by $ir(c_k)$, where $d_n \in c_k$. As the data segment $d_n$ is new to the system, its popularity class is ideally chosen as the most likely popularity class given that it belongs to relevance class $c_k$ or can be assigned manually by an administrator or user.

An estimate of the most likely popularity index for a data segment that belongs to a certain relevance class can be obtained by updating at each time interval the popularity index estimate for each relevance class as $ip,n(c_k)=\max(ip,n-1(c_k)-\epsilon_0, 0)$, if no data segment of class $c_k$ is retrieved at the (n−1)-th time interval, or $ip,n(c_k)=\min(1, ip,n-1(c_k)+\epsilon_1)$, otherwise, where $\epsilon_0$ and $\epsilon_1$ are constant parameters.

In the absence of data access statistics, e.g. at initialization of a storage system, a correspondence between classes and storage tiers can be initially assumed, i.e. the higher the relevance class, the higher the storage tier wherein a hierarchy of the storage tiers is applied according to a single one or a combination of characteristics of the different storage tiers. E.g., a storage tier can be higher in the tier hierarchy if it provides faster access times, etc. However, some time after initialization of the storage system, additional information about the popularity of the data segments associated with a certain class is generated due to data retrieval activity and this can impact the selection of the storage tier, e.g. the higher the popularity of a relevance class, the higher the storage tier to which a new data segment in this class is assigned. Again, the storage tier can be regarded as superior in the tier hierarchy if it provides faster access times, for example.

In a preferred embodiment, an assignment of a tier placement T(dn) follows:
1) $T(dn)=ft(ir(ck), ip,n(ck))$, and specifically $T(dn)=ft(\rho \cdot ir(ck)+\sigma \cdot ip,n(ck))$ and an assignment of a protection level Q(dn) follows: 2) $Q(dn)=fq(ir(ck), ip \cdot n(ck))$. In a preferred embodiment, a redundancy level U(dn) is assigned to a data segment dn as follows: 3) $U(dn)=fu(Q(dn), T(dn))$, where ft and fq are functions that univocally map a metric value to a tier level and to a protection level, respectively, $\rho$ and $\sigma$ are given system parameters, and fu is a function that maps a tier and a protection level to a redundancy level. Hence, the determination of both a storage tier and a protection level for a data segment is preferably dependent on both the relevance index and the popularity index.

TABLE I

| | Associated with | Determined by |
|---|---|---|
| Protection Level | Data segment | Relevance (or importance) of data segment |
| Reliability Level | Tier | Failure characteristics of the devices in the tier |
| Redundancy Level | Data segment | Protection level of the data segment and the reliability level of the tier(s) in which it is stored |

Table I illustrates of the dependencies of the various levels. While in this embodiment, the protection level is solely dependent on the relevance class, the redundancy level, as the sole or one of more protection measures for implementing the assigned protection level, is dependent on this very protection level assigned as well as on the determined storage tier. For quantifying the redundancy level, the selected storage tier is preferably represented by its reliability which can be classified into a reliability level out of a set of reliability levels given that each type of storage device differs in particular in reliability, e.g. expressed by a bit-error rate. E.g., the bit error rate of tape is currently in the order of 1e-19, whereas that of HDDs is in the order of 1e-15.

Preferably, it is assumed that any storage tier selection is inherently dependent not only on the parameters assigned to the data segment to be stored, but also on the specifics of the storage tier, which in one embodiment can be represented by the reliability level into which its bit error rate can be classified.

The above equations (1) and (2) preferably implement at least one of the following characteristics:
a. The more relevant (or important) a data segment is, e.g. expressed by its associated relevance index, the higher its assigned level of protection;
b. The more popular (or frequently accessed) a data segment is, e.g. expressed by its associated popularity index, the faster the access it requires, i.e. the faster the storage tier that is selected for storage.

The following Table II illustrates an assignment of a storage tier and a protection level to a data segment according to this embodiment of the present invention:

TABLE II

| | Relevant data | Less important data |
|---|---|---|
| Popular data | High level of protection Faster tier | Low level of protection Faster tier |
| Infrequently accessed data | High level of protection Slower tier | Low level of protection Slower tier |

A protection level can be implemented by applying at least one defined error correction code/s to the data segment, applying an erasure code across devices—such as RAID for HDDs—or storing the data segment a number of times in the same or in different tiers for providing redundancy. A combination of the means applied is also referred to as protection scheme or protection measure.

The following Table III illustrates an assignment of a storage tier and a protection level according to an embodiment of the present invention, wherein the protection level of a data segment is determined by the relevance class assigned, and wherein the storage tier is selected e.g. dependent on the access frequency information for the subject relevance class. The less frequently the data segment is accessed the lower is the storage tier in which the data segment is stored. However, a lower storage tier can not only be slower in access time but also be less reliable. The data segment can a priori be assigned to a less reliable storage tier in view of more preferred storage tiers already being occupied. The requested protection level can still be achieved via determining a suitable redundancy level. According to Table III, relevant data segments that require a high level of protection can therefore be stored on a less reliable storage tier, however, in multiple copies in this storage tier thereby providing a high level of redundancy. Alternatively, the data segments requiring a high level of protection can be stored in a more reliable storage tier. However, requiring only a moderate number of copies in this storage tier, i.e. a moderate level of redundancy. In a third alternative, multiple copies of such data segments can be stored across multiple tiers.

TABLE III

| | Relevant data | Less important data |
|---|---|---|
| Less reliable tier | High level of protection High level of redundancy | Low level of protection Moderate level of redundancy |
| More reliable tier | High level of protection Moderate level of redundancy | Low level of protection Low level of redundancy |
| Multiple tiers | High level of protection Multiple copies stored across tiers | Low level of protection Fewer copies stored across tiers |

After the various determinations, the selector can forward the data segment to be stored together with the relevance class information, the protection level information and information as to the suggested storage tier to the storage unit, and in particular its logic. In a preferred embodiment, the required protection measure is also already determined by the selector and submitted to the logic.

Logic is provided for storing the data segment in the determined storage tier and for implementing the determined level of protection. The protection level can therefore in one embodiment be translated into a protection measure including at least one storing a number of copies, also referred to as redundancy level, selecting an error correction code, or selecting an erasure code. Alternatively, if the protection measures are already determined by the selector, the logic can apply these protection measures. The logic can be implemented in hardware, software or a combination of both and is meant to be the entity executing the suggestion taken by the selector.

A data segment finally stored in the assigned storage tier is preferably stored together with the assigned relevance class and the assigned protection level. These levels can be stored in combination with other metadata for the specific data segment.

According to a preferred embodiment of the storage system, however, also as an aspect independent from the previously introduced embodiments of the storage system and the corresponding storage unit, a storage relocation manager is introduced. In a dynamic storage system, the popularity of each data segment as well as its relevance, although to a lesser extent, can change over time. Hence, a unit referred to as storage relocation manager can be in charge for moving data segments to other storage tiers of the storage unit, also referred to as target storage tiers. For example, when the popularity of a data segment increases it can be desirable to move it from a present slow storage tier to a faster storage tier to enable quicker access. When the popularity of a data segment decreases it can be desirable to move it from a fast present storage tier to a slower storage tier to free up space for other popular data segments. However, any movement solely based on the popularity index can have impact on the protection level, too, e.g. when the target storage tier has a different reliability than the present storage tier. The same is true when a data segment is replicated across multiple tiers.

In a preferred embodiment, the storage tier relocation manager is configured, in case of a relocation, to apply the protection measure by selecting at least one of: a redundancy level specifying a number of copies of the data segment to be stored in at least one of the target storage tier and a non-target storage tier; an error correction code to be applied to the data segment; and an erasure code to be applied to the data segment. The storage tier relocation manager is further configured to store the data segment in the storage unit according to at least one selected at the redundancy level, the error correction code and the erasure code.

In a preferred embodiment, the storage relocation unit, which is also referred to as the migrator, receives information from an access pattern evaluator such as described above and as such receives access frequency information for the individual relevance classes. This access frequency information enables the migrator to place data segments in the right storage tier to enhance access performance. Specifically, the migrator can move data segments stored in a present storage tier to another storage tier if such movement is indicated by the present access patterns of such data segments, and specifically by the access patterns of the class in which the respective data segment belongs. In another embodiment, the migrator can in addition monitor a relevance class assigned to the data segment and, specifically a change in such relevance class, which can also lead to a relocation of the data segment to a different storage tier.

It can be desirable that more relevant and popular data segments deserve a higher level of protection. To ensure a certain protection level in a given storage tier, a protection scheme is employed which is understood as a combination of protection measures to implement the desired protection level. The protection scheme can entail a combination of error correction codes within devices—e.g. for type (a) impairments —, erasure codes across devices—e.g. for type (b) impairments —, and replication across devices—e.g. for type (c) impairments as laid out above. However, when observing a different access frequency than in the past which can advise to move a data segment to a different storage tier, i.e. the target storage tier, the protection level in the target storage tier can be different than that of the present storage tier. If, on the other hand, the relevance of the data segment has not changed, the protection scheme preferably is to be amended. This is already because different storage tiers exhibit different levels of reliability, e.g., the bit-error rate of tape is 1e-19 whereas that of HDDs is 1e-15. Consequently, when moving data segments from one storage tier to another, the migrator preferably adapts the applied protection scheme in order to maintain the same protection level, e.g., by at least one changing between 2-way versus 3-way replication, applying error correction and/or erasure codes with different number of parities.

For each data segment dl, l=1, . . . , L, stored in the storage unit, an access pattern evaluator such as the one described above preferably assigns a popularity class c'j and an associated popularity index ip(c'j) which are determined by the number of accesses and the amounts of data read and written to each data segment in the recent history of time period T1. The popularity class of each data segment is periodically sent by the access pattern evaluator to the migrator with time period T2. The migrator then uses this information along with the relevance index ck of each of each segment to determine a target tier Tn(dl), the new protection level Qn(dl), and the new redundancy level Un(dl) for that data segment for the time period nT2 to (n+1)T2 using expressions similar to (1), (2), and (3), e.g.:

$$Tn(dl)=ft(ir(ck),ip(c'j),C1, \ldots ,CM,P1, \ldots ,PM), \quad (4)$$

$$Qn(dl)=fq(ir(ck),ip(c'j)), \quad (5)$$

$$Un(dl)=fu(Qn(dl),Tn(dl),R1, \ldots ,RM), \quad (6)$$

wherein ft and fq are functions e.g., linear, that univocally map a metric value to a storage tier and to a protection level, respectively, and fu is a function that maps a tier and a protection level to a redundancy level. Here, C1, . . . , CM are the costs per gigabyte, P1, . . . , PM are the power consumption of a device, and R1, . . . , RM are the reliability indices which are metrics for the levels of reliability for each of the M tiers.

In one embodiment, for cost reduction, a certain protection level can be guaranteed by placing copies of data segments across multiple storage tiers. For example, a data segment with high relevance index and low to moderate popularity index can have one replica on an HDD storage tier for performance purposes, and another replica on a tape storage tier for reliability and cost purposes. It is known that erasure codes can provide much higher storage efficiency than replication for the same level of reliability. On the other hand, erasure codes can suffer from reduced access performance. Therefore, depending on the relevance and popularity indices, a choice can be made between an erasure code and replication based on the trade-off between storage efficiency and performance.

As described in connection with the selector, it is preferred that the Tables I, II and III also apply in the migration of already stored data segments, preferably in connection with the level of protection being specified for data segments in terms of certain metrics, e.g., MTTDL, availability, delay, etc, which can be associated with relevance classes and preferably popularity; in connection with the level of device reliability being specified in some metric (MTTF, . . . ) such as a failure or error characteristics of the storage devices/tiers, and in connection with the level of redundancy specifying parameters of an underlying redundancy scheme. The levels of protection for the data segments and the levels of device reliability for the device/s used within each tier are preferably known prior to a data segment replacement. The levels of redundancy are preferably determined such that the protection level for each data segment is guaranteed when the data segment is placed in a target tier.

The process introduced above is also referred to as dynamic tiering and can typically occur over large time scales compared to a time interval T over which a data segment is received for storage. The policies, according to which data is moved across different storage tiers and hence different types of storage devices, depend on access pattern characteristics and in addition preferably on the assigned relevance class. Depending on the storage device performance characteristics, certain tiering strategies can be better for a given workload than others. For instance, data segments accessed sequentially are preferably placed on HDDs, whereas randomly accessed data are preferably placed on SSDs. Also, it is conceivable that the updated information regarding the popularity of the data segments associated with the various relevance classes in one embodiment is used to determine subsequent data segment movements. This, in turn, can steer the employment of effective caching and tiering strategies that have a significant effect on the cost and performance of the storage system.

In embodiments, the storage capacity manager can include at least one of the following features: the storage capacity manager is configured to manage a storage unit including at least two storage tiers; the monitoring unit is configured to determine if the utilization of at least one of the at least two storage tiers fulfils the criterion; the capacity managing unit is configured to, in response to the utilization of at least one storage tier fulfilling the criterion, selecting the at least one data segment stored in this storage tier for one of a deletion thereof or a deletion of a copy thereof in the same storage tier or a different storage tier; the monitoring unit is configured to determine if the utilization of the storage unit falls below a capacity threshold; the capacity managing unit is configured to select, in response to the utilization of the storage unit falling below the capacity threshold, the at least one data segment; the capacity managing unit is configured to one of: suggest the at least one selected data segment for deletion or deletion of a copy thereof; suggest the at least one selected data segment for deletion or deletion of a copy thereof and delete the at least one selected data segment or a copy thereof in response to a user confirmation; delete the at least one selected segment or copies thereof; the capacity managing unit is configured to assign a retention class out of a set of retention classes to the data segments in the storage unit, each retention class out of the set indicating a measure for retaining the assigned data segment in the storage unit, the assignment of the retention class to a data segment being made dependent on the relevance class assigned to the data segment; the capacity managing unit is configured to select the at least one data segment for one of a deletion thereof or a deletion of a copy thereof dependent on the retention class assigned; the capacity managing unit is configured to select the at least one data segment for deletion if the corresponding data segment is within a number of n data segments showing the lowest retention classes assigned; the capacity managing unit is configured to manage the storage of data segments in a variable number of copies; the capacity managing unit is configured to select the at least one data segment for deleting at least one copy thereof if the corresponding retention class is below a retention threshold; and the capacity managing unit is configured to determine the retention class to assign to a data segment in addition dependent on at least one of an age of the data segment; access frequency information for the data segment or for the relevance class the data segment is assigned to; a persistence index; a storage capacity available in at least one of the other storage tiers in case of a tiered storage unit.

According to a preferred embodiment of the storage system, however, also as an aspect independent from the previously introduced embodiments of the storage system and the corresponding storage unit, a storage capacity manager is introduced because of the finite capacity of the storage unit, and a foreseen large amount of data segments steadily created within a big data system, which will likely make it necessary to discard obsolete data segments and/or to judiciously increase the storage system capacity of the storage unit. The storage capacity manager preferably has the main functionality of avoiding a storage unit capacity overflow by suggesting deleting the least relevant data segments from the storage unit, and/or by reducing a redundancy of data segments, i.e. deleting at least one copy of at least one data segment, and in particular by deleting at least one copy of at least one data segment belonging to a certain relevance class, and/or by providing recommendations to a system administrator for a capacity extension of the storage unit. For instance, whenever the stored data segments approach an available capacity of the storage unit which can be considered as a criterion of a utilization of the storage unit being fulfilled for initiating action the fulfilling of which criterion is monitored by a monitoring unit, and in particular if new storage capacity cannot be made available, a capacity managing unit of the storage capacity manager can select at least one data segment stored in the storage unit and can suggest these data segments or copies thereof for removal, i.e. erasure from the storage unit, or delete the selected at least one data segment or copy thereof, or delete the selected at least one data segment or copy thereto after having suggested for deletion to a user or to an administrator and after having received a confirmation for doing so.

The storage capacity manager can act on an individual storage unit such as an HDD, a tape, or an SDD, and as such detached from the previously described multi-tiered storage unit. However, in case of the storage unit including multiple storage tiers, the storage capacity manager can act on each storage tier individually or on the storage unit as a whole. Hence, the utilization of the storage unit fulfilling a criterion such as falling below a capacity threshold and therefore indicating a shortage of storage capacity in the storage unit, can refer to an individual tier of the storage unit or to the overall storage unit. Hence, in one embodiment, it can suffice that the monitoring unit detects an individual storage tier falling short of free capacity and therefore triggering a selection process for finally suggesting and/or deleting selected data segments in this specific storage tier. In another embodiment, the criterion can be set such that the total capacity of the storage unit including the multiple storage tiers is compared to a capacity threshold and initiates the selection process. In yet another embodiment, the detection of the storage capacity of an individual storage tier falling below a capacity threshold can trigger a selection of data segments out of the entire storage unit not limited to the data segments stored in the storage tier that falls short in free capacity. It is noted that in the case of a tiered storage unit thresholds indicating a shortage of free capacity can be set different for different storage tiers.

The monitoring unit for monitoring the fulfillment of the criterion related to the storage capacity or of a part of the storage unit can be embodied as hardware or software or a combination of both. The utilization of the storage unit can in one embodiment be represented by the still available storage capacity of the respective unit or of an individual storage tier, or by the utilized, i.e. occupied and/or reserved storage capacity of the storage unit or by an individual storage tier. Preferably, the criterion indicates a shortage of still available storage capacity in the respective storage tier or unit. In another embodiment, the criterion can be a rate at which new data segments are stored in the storage tiers or in the storage unit as a whole.

The capacity managing unit can be embodied as hardware or software or a combination of both and be implemented together with the monitoring unit in a dedicated processing unit. The capacity managing unit preferably is configured to select at least one of the data segment or copy thereof that can be considered as more suitable for erasure than others. Accordingly, the selection is taken dependent on at least a relevance metric indicating the value of each data segment, i.e. the relevance classes introduced before. It is preferred, that the data segments with the least relevance metric, i.e. the lowest relevance class indicating the lowest relevance of the corresponding data segment be suggested for erasure or at least for erasure of copies thereof. In one embodiment, the capacity managing unit takes a class-wise approach and suggests the data segments belonging to a common relevance class for erasure without differentiating between the data segments within such relevance class. In a different embodiment, however, the capacity managing unit takes an individual approach to data segments and can even differentiate between importance values of data segments with a common relevance class, e.g. by means of further evaluation of the content of the data segments, or by means of applying additional information available for the data segments.

The selection can be performed dependent on additional parameters, such as at least one access frequency to the subject data segments, an age of the data segments, a persistence metric assigned to the data segments, an obsolescence of data segments, etc.

In a preferred embodiment, the following metric is introduced for the storage capacity manager to determine which data segments are selected for further action, e.g. for deletion, suggestion for deletion, or a reduction or suggestion for reduction of redundancy. $R(dl)=fR(ir(ck), i'p(c'j), ia(dl), is(dl))$ or, in a more specific embodiment:

$$R(dl)=fR(\gamma ir(ck)+\delta i'p(c'j)+\eta ia(dl)+\kappa is(dl)), \quad (7)$$

where $ir(ck)$ is a relevance class to which data segment dl belongs, i.e., $dl \in ck$, where the index l denotes the data segment number; $i'p(c'j)$ is a popularity class c'j to which data segment dl belongs, i.e., $dl \in c'j$; $ia(dl)$ is an age of the data segment dl;
$is(dl)$ is a persistence of a data segment dl.

In general, the popularity class is different from the relevance class, and the popularity class of a data segment can vary with time. The popularity class can be defined as in connection with the storage system described above, and a determination of which can be supported by an access pattern evaluator such as described above. The relevance class can be determined by means of a classification unit such as described above, and can be stored as metadata together with the data segment in the storage unit. The age of the data segment can denote the age for which the data segment resides in the storage unit. The persistence of a data segment can in one embodiment be defined by a user or an administrator of the storage unit and specifically can take a value in the interval [0, 1], where persistence level 1 means "never delete", and 0 means "obsolete data".

In a preferred embodiment, the storage capacity manager applies the following rule: If $R(dl)<thr1$ then delete data segment dl; If $thr1<R(dl)<thr2$ then reduce a redundancy of data segment dl; note that the term $\kappa\, is(dl)$ alone must be able to be $>thr1$ to avoid unintended deletion; If $thr2<R(dl)$ then keep data segment dl unmodified.

It is preferred that at least one copy of a data segment is suggested for removal first before removing the data segment as such, i.e. all copies thereof. Instead of or in addition to a suggestion or a removal of data segments or copies thereof, or in case the storage capacity manager determines that all existing data segments in the storage unit are still important, a recommendation can be made by the storage capacity manager to a user or an administrator as to expand the storage capacity of the storage unit or at least a tier of the storage unit in case of a multiple tier storage unit.

An automatic recommendation for a storage capacity expansion can be based on or more of: a computation of a capacity required to extend the present storage capacity by x %; or to serve storage requirements for the next y months, based on a historic capacity growth rate; a determination of a storage device mix based on at least one storage unit needs, a current storage tier utilization, a historic capacity growth rate per storage tier, etc.

A storage system as suggested in various embodiments addresses the content of the data segments to be stored and preferably classifies the data segments in real-time. Preferably, each data segment to be stored is associated with a relevance index reflecting the assigned relevance class and a popularity index reflecting the access frequency for data segments of the same relevance class in the data storage. Based on at least this two-fold information, the storage system allows a full automatic selection of an appropriate level of protection for each data segment, and a full automatic selection of a storage tier a certain data segment is to be initially stored, all without human intervention.

A heterogeneous storage infrastructure, including e.g. solid-state drives, hard-disk drives, and tape systems, can efficiently be used. Performance, reliability, security, and storage efficiency at low operating cost and power consumption are achieved by evaluating the importance of the stored information for the purpose of, e.g., of unequal data protection, intelligent tiering, and eventually erasure of obsolete data.

As explained in the previous sections, in embodiments of the storage system different levels of protection are granted to data segments to be stored, depending on the relevance of the information contained. In one embodiment, it is assumed that data segments received for storage are classified by a classifier into one out of K+1 relevance classes, depending on their information content. Preferably, data segments with poor information content due to, e.g., calibration procedures or presence of interference, are assigned to Class 0, and preferably are discarded or stored at the lowest possible cost. Data segments in the remaining K classes are input to K different block encoders for error correcting codes. Each encoder can be characterized by parameters ni and ki, where ki is the number of data symbols being encoded, and ni is the total number of code symbols in the encoded block. Specifically, a multi-tiered storage system with seven relevance classes is considered, where data segments are assigned to the various relevance classes according to a binomial distribution with parameter p. Again, the data segments assigned to Class 0 are assumed to be irrelevant. The data segments in Classes 1 to 6 are then encoded with a RS (64,ki) code from GF(28), where ki goes from 60 to 40, i.e., the code length n is held at a constant value equal to 64, whereas the number of data symbols is given by ki=64-4i, i.e., the number of data symbols decreases from k1=60 to k6=40. The redundancy thus increases from 4 symbols within a codeword for Class 1 to 24 symbols for Class 6. To assess a gain in storage efficiency that is obtained by the assumed storage system, consider an application where the data segments correspond to images with 100×100 pixels. Data segments might be assigned to Class 0 and discarded if collected, e.g., during calibration of experiments or in the presence of interference. For a random channel bit-error probability of 10-3, the six classes define sequences of images where in the average one pixel is in error every 1, 102, 105, 108, 1011, 1014 images after retrieval, respectively. The efficiency gain obtained by the considered system with unequal error protection and binomial class probability distribution over a system that adopts RS encoding by a (64,40) code from GF(28) for all data segments, is given in percent by $$g = \left( \frac{64}{40} \frac{1}{\sum_{k=1}^{6} \binom{6}{k} p^k (1-p)^{6-k} \frac{64}{64-k}} - 1 \right) \times 100$$

A storage system as introduced, which can also be referred to as cognitive data storage system, preferably is applied for big data applications. In such storage system, information can be efficiently extracted, stored, retrieved, and managed. Preferably, in a first step, online detection and classification techniques are applied on incoming data segments. In this step, the occurrence of events that are associated with valuable information are preferably detected and classified. Preferably, in a second step, the result of the classification procedure together with information about the access patterns of similarly classified data is used to determine with which level of protection against errors, and within which tier of the storage system the incoming data segments are to be initially stored.

For instance, this cognitive approach could be useful for application in an existing system (such as LOFAR) or in the future square kilometer array (SKA) telescope system. In particular, it can be applied to optimize future data access performance. Various workload characteristics can be evaluated for data placement optimization, such as sequentiallity and frequency of subsequent data accesses. Based on this information, the appropriate tier for storing the data can be determined. Moreover, predictions regarding subsequent data accesses can enable effective caching and pre-fetching strategies.

In the specific embodiment of the Square Kilometer Array, the functions of the classification unit can be performed by an enhanced version of a Science Data Processor ("SDP"). The SDP preferably has the task to automatically calibrate and image the incoming data, from which science oriented generic catalogues can be automatically formed prior to the archiving of images that are represented by the incoming data segments. Note that an event detector/classifier pair in the classification unit can face the challenging task of determining in real time a set of features related to a detected event, for example real time detection and machine-learned classification of variable stars from time-series data. In this case, the detection of variable stars using the least squares fitting of sinusoids with a floating mean and over a range of test frequencies, followed by tree-based classification of the detected stars can in one embodiment be well suited for online implementation. Within the current SKA architecture, the functions of a Multi-Tier Storage ("MTS") system preferably are performed by an enhanced version of a Science Data Archive Facility.

For applications within the healthcare industry, the functions of the classification unit preferably depend on the context of the data being stored. For example, if data segments being collected are used for a cohort study, the parts that are relevant to the study can be classified as more important than other data. In the context of personalized medicine, medical records can be identified by their type, e.g., biochemistry, hematology, genomics, hospital records. Within each type, relevant features can be classified and associated with a certain level of importance.

FIG. 1 shows a block diagram of a storage system according to an embodiment of the present invention. The storage system includes two main subsystems, i.e. a classification unit 1 also referred to as Real Time Processing & Classification ("RTPC"), and a storage unit 2 also referred to as MTS. In the classification unit 1, an incoming data stream containing data segments is elaborated by a real-time processing unit 15, typically to perform at least one filtering operation, suppression of spurious data segments, e.g., removing interference in the context of astronomical data application, ensuring privacy of medical records by pseudonymization in the context of cohort studies in the healthcare industry, or extracting relevant information from medical records in the context of personalized medicine. An output of the real-time processing unit 15 is presented to a set of N online event detectors 11. Each of the N event detectors 11 determines whether the occurrence of an event, which can be associated with predefined information, is detected within a segment of the incoming data stream. Each event detector 11 of the set can be configured to detect a specific event that is different from the events the other event detectors 11 of the set are expected to detect.

In general, real-time classification can refer to any initial data evaluation that can take place while guaranteeing a predetermined sustained rate of the incoming data stream. Whenever a relevant event is detected by one of the N event detectors, an associate online classifier 12 assigns the data segment, which contains the information related to the event, to one of K+1 relevance classes with K≥0 depending, e.g., on the presence or absence of features that characterize the event. Data segments, where event-related information is not detected, are assigned by default to a Class 0. Note that a set of N buffers 13 is included in the data paths to compensate for delays introduced by the associate event detector 11 and classifier 12. Also note that in a preferred embodiment, several pairs of event detectors 11 and classifiers 12 can be operating in parallel, if events of different nature are deemed relevant, as illustrated in FIG. 1 for N detector 11/classifier 12 pairs, with N=3. In this case, a data segment can be associated with multiple tags assigned by the various classifiers 12, and a buffer 16 in the main data path to the storage unit 2 preferably is dimensioned to accommodate a largest delay expected to be introduced by the classifiers.

In other embodiments, only the occurrence of a single event is desired to be detected, in which case the event detector at the same time acts as classifier—or the classifier acts as event detector. In a different embodiment, the occurrence of an event can be known a priori and only event features are desired to be identified, in which case the event detector/s 11 is/are not needed.

The data segments and the related class information—which class information can be subsumed under the data segments metadata—are received by a selector 14, which has the task of determining with which level of protection and to which tier each data segment received is to be stored. This decision depends on the information on the relevance class and on an access pattern to this relevance class, which is obtained from an access pattern evaluator 24 assigned to the storage unit 2.

The storage unit 2 receives from the classification unit 1 the processed sequence of incoming data segments to be stored in a multi-tier storage 21 containing M storage tiers, together with the individual information for each data segment about detected events, and identified relevance classes and possibly other features. This information preferably is utilized to assign a protection level for the respective data segment and an initial placement in one of the available storage tiers 21. An M-tier storage system with J data segment protection levels, with M=3 and J=3, is illustrated for example in FIG. 1. The three storage tiers 21 might correspond to different type of storage media, e.g., SSDs, HDDs, and tape. For performance optimization during normal system operation, frequently accessed data or randomly accessed data can preferably be placed on SSDs, whereas less frequently accessed data or sequentially accessed data can be stored on HDDs or on tape.

Prior to being stored on the physical media corresponding to the selected storage tier 21, each data segment is presented to an encoder 23, which provides different levels of protection, for example using unequal error protection ("UEP"), depending on the relevance class information. In an embodiment, compression and/or deduplication of the data segments can be considered in addition to UEP. A data segment with a high relevance class preferably is associated with a high value. Its information content is such that a loss would be associated with a high cost, and therefore the data segment is protected with a higher level of redundancy. The required level of redundancy can be provided by error correction coding or erasure coding, by storing replicas of the data segments, or by a combination of these techniques. Note that compression and/or deduplication of the data segments can be considered in addition to UEP.

An access pattern evaluator 24 of the storage unit 2 provides additional information about the popularity of the data segments associated with a certain relevance class. Every time a data segment is accessed in the storage unit 2, the associated metadata information including the class information is provided to the access pattern evaluator, which learns about the popularity of the information content in the data segments from the way they are being accessed. Access patterns can be found at various levels, e.g., activity during various times of a day, sequence of reads and writes, access sequentiallity, and number of users retrieving the data. This information is used to further classify data segments into one of several popularity classes.

Subsequently, the access pattern evaluator 24 sends information to the selector 14 in the classification unit 1, which accordingly updates a metric for initial decision on level of protection and storage tier of individual data segments. Therefore, the selector 14 updates the criterion for initial data placement based on both data relevance classification and data access statistics. In this manner, a data segment that belongs to a certain relevance class is passed out to the storage medium and is protected against errors with a redundancy level that are most appropriate at a particular point in time. Following an initial data placement, the access pattern evaluator 24 monitors all data segments in the storage tiers 21 and places each in the appropriate popularity class.

In the present embodiment of FIG. 1, a migrator 25 is provided, also referred to as storage relocation manager, which is preferably arranged in the storage unit 2. The migrator 25 receives information from the access pattern evaluator 24, and as such receives access frequencies to the individual classes. This information enables the migrator 25 to place data segments in the right storage tier 21 to enhance access performance. Specifically, the migrator 25 has the task of moving data segments stored in one storage tier 21 to another storage tier 21 if such movement is indicated by the present access patterns to such data segments, and specifically by the access patterns of the class to which the respective data segment belongs. This classification enables the migrator 25 to place the stored data segments in the right storage tier to enhance access performance.

In the present embodiment of FIG. 1, storage efficiency and access performance are further optimized by continuously monitoring the access patterns and updating the criteria for data segment placement in a storage capacity manager 26. When the amount of data segments stored in the storage unit system approaches a system capacity, an automatic selection of data segments for deletion or deletion of copies thereof is provided by the storage capacity manager 26. The selected data segments and/or copies thereof can be deleted and/or can be suggested for deletion and/or a system capacity expansion is requested, all preferably based on the importance and the access patterns of the data segments stored in the system.

Figure 2:
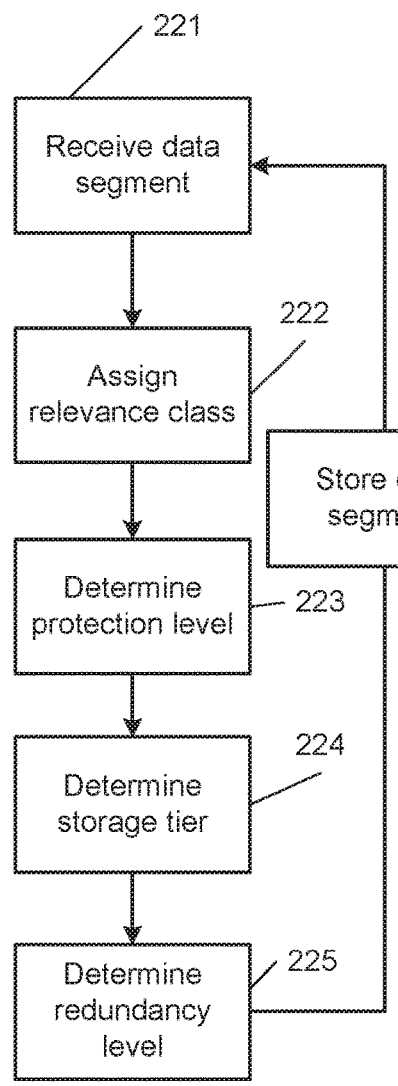
FIG. 2, a flowchart of a method for storing a data segment in a storage tier of a storage unit including at least two storage tiers, according to an embodiment of the present invention.

FIG. 2 illustrates a flowchart of a method for storing a data segment in a storage tier of a storage unit including at least two storage tiers, according to an embodiment of the present invention. In step 221 a data segment is received for storage. In step 222, at least one out of a set of at least two relevance classes is assigned to the data segment dependent on information included in the data segment. In step 223, a level of protection is determined for the classified data segment dependent on the relevance class assigned. In step 224, a storage tier is determined out of the at least two storage tiers for storing the classified data segment to dependent on at least access frequency information received for data segments in the same relevance class, and dependent on the characteristics of the storage tiers available. In step 225, a redundancy level is determined for the data segment dependent on the determined protection level and the determined storage tier. In step 226, the classified data segment including the assigned relevance class is stored in the determined storage tier and copies of the data segment are stored in the determined storage tier or in a different storage tier according to the determined redundancy level.

Figure 3:
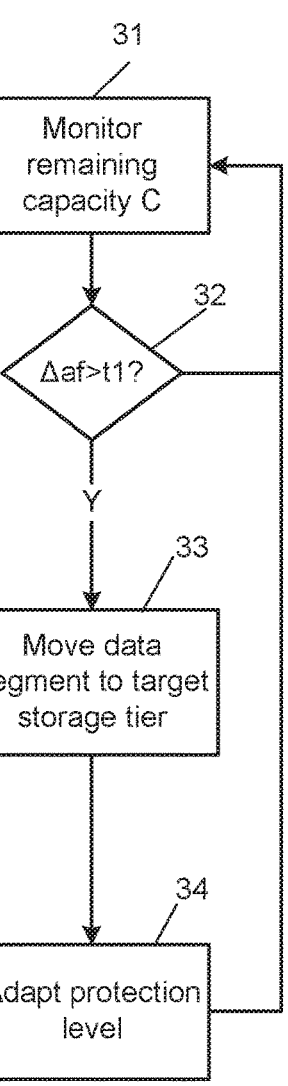
FIG. 3, a flowchart of a method for relocating a data segment presently stored in a storage tier of a storage unit, according to an embodiment of the present invention.

FIG. 3 illustrates a flowchart of a method for relocating a data segment presently stored in a storage tier of a storage unit with at least two storage tiers, according to an embodiment of the present invention. In step 31, an access frequency to a relevance class is monitored. In step 32, it is verified if a change in an access frequency Δaf to data segments stored in the storage unit and belonging to the subject relevance class exceeds a threshold t1. If not, the access frequency is continued to be monitored in step 31. If yes (y), a data segment assigned to the subject relevance class and stored in a present storage tier is moved to a different storage tier, i.e. a target storage tier. In step 34, protection measures are adapted for this relocated data segment in order to achieve a protection level assigned to the data segment.

Figure 4:
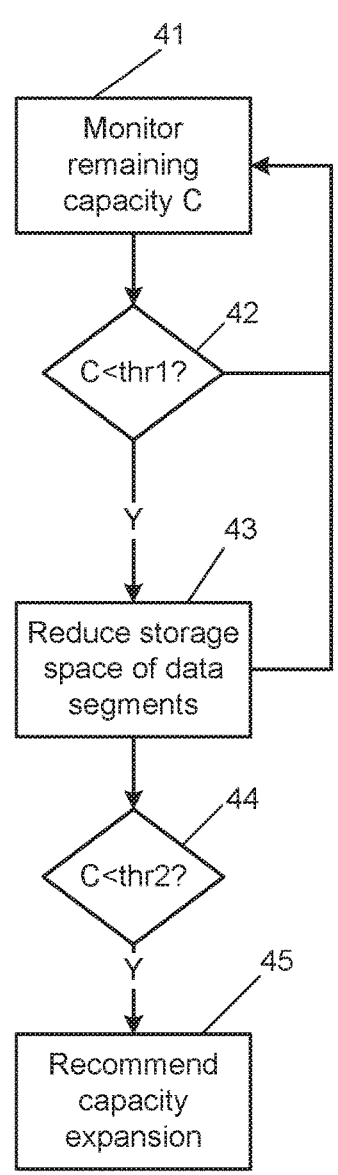
FIG. 4, a flowchart of a method for managing a capacity of a storage unit for storing data segments, according to an embodiment of the present invention.

FIG. 4 illustrates a method for managing a capacity of a storage unit for storing data segments, according to an embodiment of the present invention, preferably executed by a storage capacity manager according to an embodiment of the present invention. In step 41 a remaining capacity C of the storage unit is monitored. In step 42 it is verified, if the remaining storage capacity C is less than a threshold thr1. If not, the remaining capacity C is continued to be monitored. If yes (y), data segments are deleted in step 43 thereby reducing the occupied storage space in the storage unit. Step 43 includes the selection of storage segments to be deleted. In the present example, the data segments are selected dependent on a relevance class assigned, and the data segments assigned to the lowest relevance class are removed. In step 44, it is verified if the remaining storage capacity C is less than a threshold thr2, which preferably is less than the threshold thr1. If not, the remaining capacity C is continued to be monitored. If yes (y), a storage capacity expansion is recommended to an administrator of the storage unit.

According to an embodiment of the present invention, a computer program product is provided including a computer readable medium having computer readable program code embodied therewith, the computer readable program code including computer readable program code configured to perform a method according to any one of the preceding embodiments.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes at least one executable instruction for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A storage system, comprising:
   a storage unit including a processor and at least two storage tiers, the processor configured to:
   obtain incoming data in incoming data segments, wherein the data segments contain data related to stars imaged by a telescope in a set of time-series images;
   detect a first particular star in a first particular data segment using least squares fitting of sinusoids;
   classify the first detected star using tree-based classification;
   classify, according to binomial class probability distribution, the first particular data segment into a relevance class based on the classifying the first detected star;
   assign the first particular data segment to a redundancy level in the at least two storage tiers, wherein the assigning is based on the relevance class and wherein the relevance class specifies a number of data symbols within a codeword in a Reed Solomon (RS) encoding scheme in which the first particular data segment is encoded;
   determine that a second particular data segment corresponds to a second particular star that was imaged in the presence of interference; and
   discard, based on the determining, the second particular data segment.

2. The storage system of claim 1, wherein the redundancy level indicates a level of protection of a stored data segment, and wherein copies of a data segment located on a storage tier with high reliability increase the redundancy level of the stored data segment by a greater degree than copies of a data segment located on a storage tier with low reliability increase the redundancy level.

3. A method comprising:
   obtaining incoming data in incoming data segments, wherein the data segments contain data related to stars imaged by a telescope in a set of time-series images;
   detecting a first particular star in a first particular data segment using least squares fitting of sinusoids;
   classifying the first detected star using tree-based classification;
   classifying, according to binomial class probability distribution, the first particular data segment into a relevance class based on the classifying the first detected star;
   assigning the first particular data segment to a redundancy level, wherein the assigning is based on the relevance class and wherein the relevance class specifies a number of data symbols within a codeword in a Reed Solomon (RS) encoding scheme in which the first particular data segment is encoded;
   determining that a second particular data segment corresponds to a second particular star that was imaged in the presence of interference; and
   discarding, based on the determining, the second particular data segment.

4. A computer program product, the computer program product comprising a computer readable storage medium having program instructions embodied therewith, the program instructions executable by a computer to cause the computer to:
   obtain incoming data in incoming data segments, wherein the data segments contain data related to stars imaged by a telescope in a set of time-series images;
   detect a particular first star in a first particular data segment using least squares fitting of sinusoids;
   classify the first detected star using tree-based classification;
   classify, according to binomial class probability distribution, the first particular data segment into a relevance class based on the classifying the first detected star;
   assign the first particular data segment to a redundancy level, wherein the assigning is based on the relevance class and wherein the relevance class specifies a number of data symbols within a codeword in a Reed Solomon (RS) encoding scheme in which the first particular data segment is encoded;
   determine that a second particular data segment corresponds to a second particular star that was imaged in the presence of interference; and
   discard, based on the determining, the second particular data segment.

* * * * *